United States Patent [19]
Columbus et al.

[11] Patent Number: 6,127,518
[45] Date of Patent: Oct. 3, 2000

[54] MONOMER-FREE POLYVINYL ACETATE DISPERSIONS AND METHOD OF MAKING SAME

[75] Inventors: Peter Spiros Columbus, Melville, N.Y.; Yogeshbhai Babubhai Patel, Gahanna, Ohio

[73] Assignee: Elmer's Products, Inc., Columbus, Ohio

[21] Appl. No.: 09/083,038

[22] Filed: May 22, 1998

[51] Int. Cl.[7] .................................. C08J 3/05; C08J 3/12; C08L 29/00
[52] U.S. Cl. .......................... 528/503; 523/331; 523/340; 524/803
[58] Field of Search .................................. 523/331, 340; 528/503; 524/803

[56] References Cited

U.S. PATENT DOCUMENTS

| | | | |
|---|---|---|---|
| 3,563,932 | 2/1971 | Varnagy et al. | 523/331 |
| 4,164,489 | 8/1979 | Daniels et al. | 524/803 |
| 5,376,703 | 12/1994 | Noelken et al. | 524/556 |
| 5,702,828 | 12/1997 | Adler et al. | 524/5 |

*Primary Examiner*—Tae Yoon
*Attorney, Agent, or Firm*—Standley & Gilcrest LLP

[57] ABSTRACT

Method of producing dry polyvinyl acetate particles that are readily dispersible in water, are vinyl acetate monomer free and are useful for making polyvinyl acetate dispersion compositions that are low in odor, form clear dried films and may be used in adhesives, sealants, caulks and coatings. The method includes manufacturing an aqueous, e.g. water, dispersion of polyvinyl acetate containing polyvinyl alcohol; drying to remove volatiles by converting the dispersion to dry form under controlled temperature conditions and redispersing the dried polyvinyl acetate particles in an aqueous medium to form a polyvinyl acetate dispersion that is substantially free of vinyl acetate monomer.

10 Claims, 2 Drawing Sheets

MONOMER-FREE POLYVINYL ACETATE DISPERSIONS AND METHOD OF MAKING SAME

BACKGROUND OF THE INVENTION

1. Field of the Invention

The present invention is directed to a method of producing a substantially monomer-free polyvinyl acetate dispersion or emulsion, typically in water or aqueous vehicles. The process of producing the substantially monomer-free polyvinyl acetate begins with producing dry polyvinyl acetate particles that are substantially monomer-free and are readily dispersible in an aqueous carrier, e.g. water. The resulting polyvinyl acetate dispersion compositions are low in odor, producing clear, dry films, and may be used in adhesives, sealants, caulks and coatings.

2. Description of the Related Art

Exposure of consumers to vinyl acetate monomer is of increasing concern. In the United States, if a product contains 0.1% or more of such monomer, a warning statement must appear on a material safety data sheet (hereinafter "MSDS"). Also, if a product contains over 1%, a "may cause skin reaction" statement will have to be added to the MSDS.

Thus, the production of a vinyl acetate which is substantially monomer-free, i.e. a substantially free vinyl acetate is one defined as having a vinyl acetate monomer (VAM) content of less than 50 ppm VAM content, i.e., 0–50 ppm of VAM (hereinafter denoted "VAM-free") consumer adhesive, sealant, caulk or coating is desirable in order to reduce possible health risks due to exposure to products which contain high contents of vinyl acetate monomer.

SUMMARY OF THE INVENTION

The present invention is directed to a method of forming dispersions of polyvinyl acetate in aqueous carriers, preferably water, from which useful products, such as sealants, caulks, coatings, and adhesives, can be made, which products are VAM-free.

The present invention is also directed to the resulting aqueous dispersion of VAM-free polyvinyl acetate and the VAM-free useful products mentioned herein.

The present invention is further directed to free-flowing, VAM-free particles of polyvinyl acetate, which are readily dispersible into a aqueous carrier, e.g. water.

DETAILED DESCRIPTION OF THE INVENTION

Figure 1:
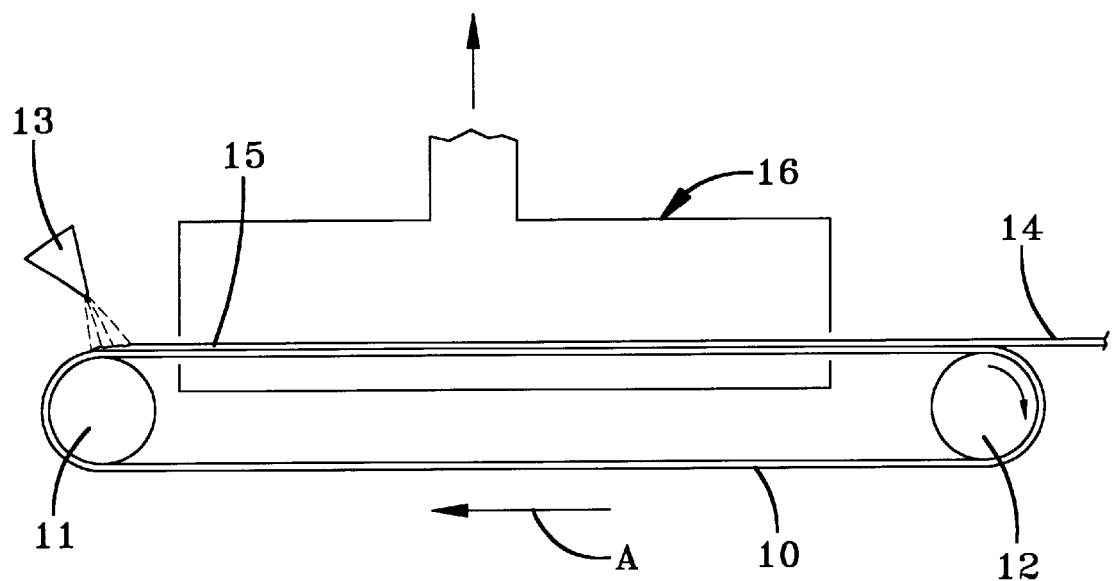
FIG. 1 is a schematic representation of a drying apparatus to remove vinyl acetate monomer from a formed sheet of polymer containing the same.

Polyvinyl acetate dispersions are known which contain vinyl acetate monomer at levels which, in view of new studies, might pose a potential health risk to consumers exposed to vinyl acetate monomer.

Thus, in order to reduce possible health risks due to exposure to polyvinyl acetate dispersions which contain high levels of vinyl acetate monomer, the inventors have carried out a detailed study of the problem and have discovered the invention set forth herein in producing vinyl acetate products that are VAM-free.

The procedure comprises the taking of a polyvinyl acetate dispersion and subjecting it to a forming step, such as film forming or particle formation, and simultaneously or sequentially, subjecting the formed polyvinyl acetate to drying conditions to form a resultant dried product.

The dry product may optionally be subjected to a comminuting step, e.g. by grinding, to further reduce the size of the dried product.

The dried product may then be redispersed into an aqueous carrier, e.g. water, by adding the dried product to the carrier, with mixing, until the introduction of the dried product into the carrier is complete and the resulting mixture is smooth and uniform.

The Polyvinyl Acetate

The specific polyvinyl acetate employed in this invention for making VAM-free product is not critical. Preferably, the polyvinyl acetate is one having an average molecular weight (MWavg) of about 30,000 to about 300,000, preferably 50,000 to 200,000. Although the solids content and viscosity of the emulsion can vary, typical total solids content can be about 40% to about 65% by weight of the polyvinyl acetate polymer emulsion. Polyvinyl acetate is commercially available as an aqueous dispersion or emulsion and can readily be made by polymerization techniques known in the art using free radical or redox catalysts, such as taught in U.S. Pat. No. 4,085,074 and its Reissue Pat. No. 30,576, the entire disclosures of which are herein incorporated by reference in their entireties.

It is preferred to use polyvinyl acetate dispersions that are homopolymer dispersions of a total solids content of about 55% by weight, although, as noted above, the solids content can vary over a wider range such as that of less than 55% by weight, e.g. 30% by weight, or less, to more than 55% by weight, e.g. 70% by weight, or more.

The particle size of the dispersed acetate particles is important in that the larger the particle size, the less tendency to coalesce. It is preferred, therefore, to have the majority of the particles less than 20 microns, preferably less than 3 and most preferably ranging from about 1 to about 3 microns in diameter.

The present inventors obtained a conventional dispersion of vinyl acetate polymer, including unreacted vinyl acetate monomer, which was then subjected to a shaping by spreading the dispersion onto a release film, e.g. polyethylene film. The release film and applied vinyl acetate dispersion was subjected to elevated temperature for a period of time while supported on a wire rack in an oven to dry the vinyl acetate dispersion also driving off unreacted monomer. The dried film of vinyl acetate and the release sheet was removed from the oven and cooled to room temperature. When cooled the release sheet and polyvinyl acetate film were separated. The dried polyvinyl acetate film was formed into flakes, which flakes were then redispersed in water. The resulting dispersion was VAM-free.

Drying Conditions

The formed polyvinyl acetate dispersion, i.e. a film or particle, is simultaneously or sequentially, with the forming step, subjected to drying conditions such as an elevated temperature. Although temperatures in excess of 200° F. may be employed, at such temperatures above 200° F. there is a tendency for coalescence of polyvinyl acetate particles. Once polyvinyl acetate particles have coalesced, fused together, the particles are difficult, and, at times, impossible to redisperse.

Thus, it is preferably, when forming the polyvinyl acetate into particles, that the elevated temperature does not generally exceed the fusion temperature, or about 200° F., and when coalescence is not a problem, temperatures above 200° F. can be employed.

The foregoing process will be illustrated by the following Examples.

EXAMPLE 1

Laboratory Procedure for Forming VAM-Free Particles

A thin even coat of a dispersion of polyvinyl acetate is applied by brush on a polyethylene film. The brush coated polyethylene films are placed on a wire rack in an oven heated to 120° F. and dried for sixteen hours. The polyethylene films and the resulting dried polyvinyl acetate product are removed from the oven and cooled to room temperature. When cooled to room temperature, the polyvinyl acetate film is removed from the polyethylene film by peeling. The polyvinyl acetate film is comminuted by crushing and grinding the film into small pieces or flakes in a grinder at medium speed taking precautions to avoid overheating of the flakes.

EXAMPLE 2

Procedure for Redispersing Dry Flakes of Polyvinyl Acetate

45% by weight of deionized water and 55% by weight of the dried flakes of Example 1 are formed into a dispersion as follows. The deionized water is charged to a clean beaker, and mixed with a Cowles blade at 400 revolutions per minute ("RPM"). The dried flakes of Example 1 are added slowly to the water. The speed of mixing is increased as the mixture of flakes and water thickens. When all the flakes are charged to the mixture, the mixer speed is increased to 600–650 RPM and mixing is continued for one hour until the mixture is smooth and uniform.

The following Table I describes the properties of the polyvinyl acetate (hereinafter "PVA") dispersions before and after drying.

TABLE I

| PROPERTIES OF PVA DISPERSION BEFORE DRYING | | PROPERTIES OF PVA AFTER DRYING AND REDISPERSING | |
| --- | --- | --- | --- |
| VAM Content | 265 ppm | VAM Content | 0% |
| Viscosity* | 2,250 Cps. | Viscosity* | 2,100 Cps. |
| pH | 4.75 | pH | 5.6 |
| Wt./Gal. | 9.1 lbs. | Wt./Gal. | 9.2 lbs. |
| % Solids | 55% | % Solids | 55% |
| Particle Size | 0.2–2 Microns | Particle Size | 0.2–2 Microns |

*Brookfield LVT #2 Spindle, 12 RPM, 25° C.

Other PVA dispersions that are commercially available can be used in place of the one used in the foregoing examples. Commercially available PVA dispersions include RHOPLEX 571, available from Rohm & Haas, Philadelphia, Pa.; DURO-SET C 325, available from National Starch and Chemical, Bridgewater, N.J.; and VINAC XX-230, available from Air Products, Allentown, Pa. Like the 55% PVA dispersions used in the Examples, the commercially available products are all homopolymers with approximately a 1:13 weight ratio of polyvinyl alcohol (PVOH) to polyvinyl acetate (PVA).

It was noted that VINAC XX-230, was only partially redispersible due to possible cross-linking of the PVA. Accordingly, it is preferable to use a non-cross linked PVA dispersion in the invention.

The following Examples will illustrate the uses of the VAM-free, PVA dispersions of the invention.

EXAMPLE 3

| VAM-Free General Purpose White Glue | |
| --- | --- |
| Water | 39.85 |
| Defoamer (Colloid 581B)* | .10 |
| Partially Hydrolyzed Polyvinyl Alcohol (Vinol 840) | 5.75 |
| Water | 3.00 |
| PVA Dispersion (55% Solids) | 44.20 |
| Dipropylene Glycol Dibenzoate | 1.00 |
| Propylene Glycol | 1.00 |
| Preservative (Kathon LX 1.5%)** | .10 |
| Water | 5.00 |
| | 100.00 |

Viscosity Brookfield RVF #4 Sp. 20 RPM at 25° C. 3,500–4,000 Cps.
pH: 4.7 ± 0.2
% Solids: 32.0 ± 1.0%
Wt./Gal.: 8.8 ± 0.1 lbs.
Color (wet): White
Dry: Clear & Colorless

*Commercially available from Rhone-Poulenc, Performance Resins & Coatings Division, Kannesaw, GA.
**A microbicide commercially available from Rohm & Haas, Co., Philadelphia, PA.

EXAMPLE 4

| Use of a Small Amount of VAM-Free PVA Dispersion as "PIGMENT" in a Predominately PVOH Adhesive to Make a Low-Cost VAM-Free "White Glue" | |
| --- | --- |
| Water | 76.2 |
| Polyvinyl Alcohol (Vinol 523) | 12.0 |
| Defoamer (Colloids 581B)* | .2 |
| PVA Dispersion (55% Solids) | 10.0 |
| Preservative (Kathon LX 1.5%)** | .1 |
| Propylene Glycol | 1.5 |
| | 100.00 |

Viscosity Brookfield LVF #3 Sp. 12 RPM 3,400 Cps.
pH: 4.8
% Solids: 19.0%
Wt./Gal.: 8.6 ± .1 lbs.
Color (Wet): White
Dry: Clear & Colorless

*Commercially available from Rhone-Poulenc, Performance Resins & Coatings Division, Kannesaw, GA.
**A microbicide commercially available from Rohm & Haas, Co., Philadelphia, PA.

EXAMPLE 5

| VAM-Free Coating | |
| --- | --- |
| PVA Dispersion (55% Solids) | 82.00 |
| Defoamer (Colloids 581)* | .20 |
| Dipropylene Glycol Dibenzoate | 12.00 |
| Preservative (Kathon LX 1.5%)** | .10 |
| CMC 7H4 Thickener☐ | .34 |
| Propylene Glycol | 1.92 |
| Colorant WD GR4202☐☐ | 2.40 |
| Water | 1.04 |
| | 100.00 |

Viscosity: RVF Brookfield #7 Sp., 20 RPM, 25° C. 40,000–50,000 Cps.

-continued

| VAM-Free Coating |
| --- |
| pH: 5 ± 0.25 |
| Solids: 61.5 ± 1.5% |
| Wt./Gal.: 9.1 ± .2% lbs. |
| Color: Green |

*Commercially available from Rhone-Poulenc, Performance Resins & Coatings Division, Kannesaw, GA.
**A microbicide commercially available from Rohm & Haas, Co., Philadelphia, PA.
☐CMC 7H4 is a trademark of Aqualon Company, Wilmington, DE for its cellulose gum.
☐☐Available commercially from Radiant Color Division, Magruder Color Co., Richmond, CA.

EXAMPLE 6

| VAM-Free Caulk or Sealant | |
| --- | --- |
| PVA Dispersion (55% Solids) | 52.6 |
| Water | 2.0 |
| Propasol Solvent B (n-Butoxy Propanol) | 3.5 |
| Glyoxal*** | .2 |
| Nytal 300 Talc**** | 34.5 |
| Titanium Dioxide***** | .5 |
| Natrosol 250 HR****** | .1 |
| Butyl Benzyl Phthalate Plasticizer******* | 5.0 |
| Preservative (Kathon LX 1.5%)** | .1 |
| N-Butyl Acetate | 1.0 |
| Water | .5 |
| | 100.0 |
| Viscosity RVF #7 sp. 4 RPM 25° C. | |
| 360,000–420,000 Cps. | |
| pH: 7.2–8.2 | |
| Solids: 70 ± 1.0% | |
| Wt./Gal.: 11.0 ± .3 lbs. | |
| Color: White | |

***Available commercially from American Hoechst Corp., Somerville, NJ.
****Commerically available from R. T. Vanderbilt Co., Inc., Norwalk, CT.
*****Commercially available as Ti-Pure R-901 from E. I. duPont de Nenouns & Co., Wilmington, DE.
******Commercially available from Aqualon Company, Wilmington, DE.
*******Commercially available as SANTICIZER 160 from Monsanto Co., St. Louis, MO.
**A microbicide commercially available from Rohm & Haas, Co., Philadelphia, PA.

EXAMPLES 7–10

Each of Examples 3–6 were repeated except that the proper amount of dry particles of VAM-free PVA were substituted for the PVA dispersions of Examples 3–6.

Best Mode Contemplated by the Inventors for Forming VAM-Free PVA Particles

In order to duplicate laboratory quality in a cost effective manner in a manufacturing plant, other drying apparatus, such as conventional "drum-drying", "spray-drying", "belt drying" and "tray-drying" equipment may be employed to achieve applicants' goal.

To effectively "spray-dry" a PVA dispersion, the PVA dispersion is mixed with an anti-caking agent such that the resultant VAM-free PVA particles do not agglomerate. Suitable anti-caking agents for spray-drying are known, such as talc, clay, and fumed silica, the latter being commercially available under the trademarks "CAB-O-SIL" and others. Talc is commercially available under the trademark VERTAL 7 from Cyprus Industrial Minerals Co., Chester, Vt., or NYTAL from R.T. Vanderbilt Co., Inc., Norwalk, Conn. Amounts of anti-caking agent are preferably less than 1% by weight, most preferably less than 0.5% by weight, as it is undesirable to introduce larger amounts of the anti-caking agent into the VAM-free PVA dispersions/emulsions of the invention.

Spray drying is conducted in a conventional spray drying apparatus (not shown) in vacuum wherein the PVA dispersion is heated to 180° F. However, preliminary testing has determined that even in the presence or absence of the anti-caking agent, spray drying is not as advantageous as belt drying. Even when an anti-caking agent is present, it has been found to result in agglomeration of the particles during spray drying and caking of the dried particles during storage, especially if the particles are subjected to pressure during storage. It is difficult to control the temperature in spray drying and higher temperatures which can be encountered cause coalescence of the particles which leads to problems in preparing subsequent aqueous dispersions of substantially monomer-free polyvinyl acetate. Thus, it would be preferable to employ a process to dry the PVA dispersion/emulsion to produce VAM-free particles without using anti-caking agents or other additives.

Drum-drying equipment (not shown) is commercially available for processing knits, woven, non-wovens, tows and other forms of polymers. However, conventional drum-drying equipment is sized so as to conduct drying by heating the material to be dried to temperatures as high as 380° F. It is preferable in the present invention not to heat the PVA dispersions to high temperatures which may tend to coalesce the PVA particles, those of 200° F. and below being preferred. While short exposure to higher temperatures are permissible, it is most preferable to conduct drying such that the PVA material does not exceed a temperature of 180° F. This is not to say that the heating environment, e.g. the interior of an oven, does not exceed a temperature of 200° F. but rather the combination of temperature of the heating environment and the residence time therein, does not raise the temperature of the PVA film above 200° F. A simple drying apparatus is illustrated in FIG. 1, which is a commercially feasible alternative to the laboratory procedure disclosed in Example 1.

In FIG. 1 is illustrated a belt drying apparatus wherein 10 illustrates an endless belt, driven in the direction of arrow A by means of rollers, 11, 12 beneath a spreading device 13. Spreading device 13 may be a nozzle operatively connected to a source of the PVA dispersion/emulsion from which it is desired to extract the vinyl acetate monomer. The spreading device 13 applies the PVA dispersion/emulsion to belt 10, forming a film of PVA 15. Belt 10 may be formed by a material which is itself a release sheet to the applied PVA film 15, but preferably is coated with a film which acts as the release sheet, e.g. a polyethylene coating. Oven 16 provides a source of elevated temperature to dry the film 15. Rotation of rollers 11, 12, length of oven 16 and temperature can be controlled so as to provide sufficient residence time of film 15 so as to drive off moisture and vinyl acetate monomer resulting in dried PVA film 14. VAM-free film 14 is separated from belt 10. The separated film can then be flaked or otherwise comminuted into particles, which flakes or particles are VAM-free.

Figure 2:
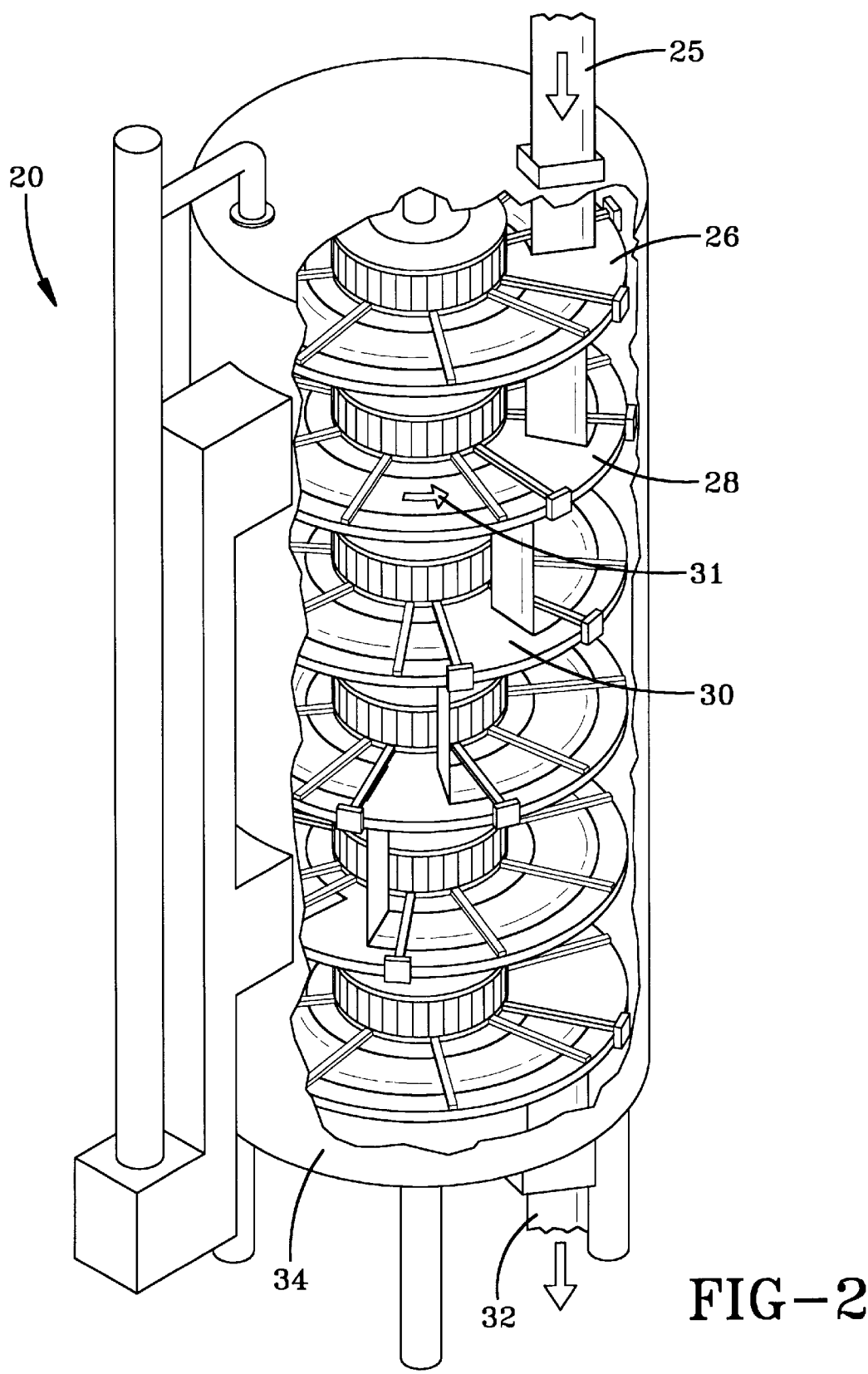
FIG. 2 is an alternative embodiment to the drying apparatus of FIG. 1, illustrating, in schematic representation, a tray dryer.

FIG. 2 shows an alternative drying apparatus. Tray dryer, illustrated generally at 20 comprises a stack of rotatable trays into which is fed a polyvinyl acetate material 25 onto a top tray 26. A stack of circular trays, of which tray 26 is the top one, slowly rotate. Material fed to the top tray 26 is wiped, after one revolution, onto the next lower tray 28, where it is mixed, leveled, and then, after one revolution is wiped onto the next tray 30 where the operation is repeated, until the dried PVA 32 exits the drier. The trays are contained in an enclosure 34 in which heated air or gas is circulated by internal fans.

Figure 3:
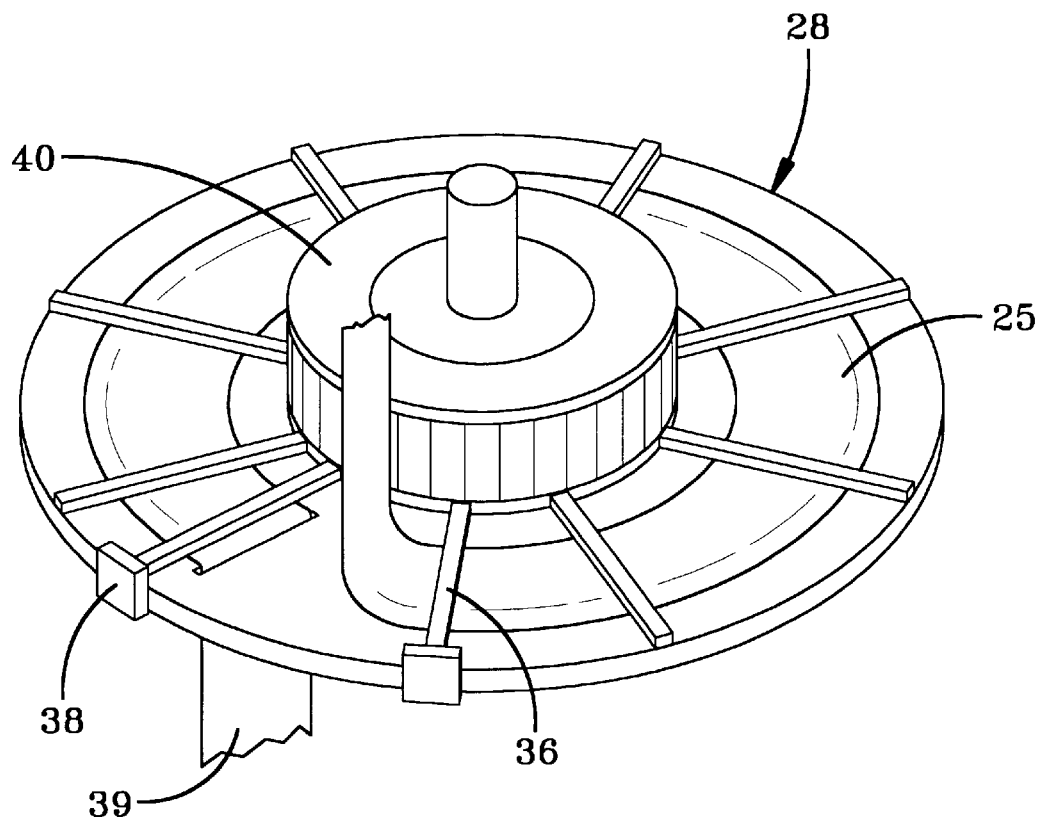
FIG. 3 is a schematic view of a single tray of the tray drier of FIG. 2.

FIG. 3 illustrates the details of a single tray of tray drier 20. Tray 28 onto which PVA material 25 is fed from the tray above (not shown in FIG. 3) is leveled by stationary leveler 36, rotated in direction of the arrow 31 (in FIG. 2) and fed, via stationary wiper 38 to the tray below (not shown in FIG. 3) to form the feed 39 to the next lower tray where the cycle is repeated. A turbo-fan 40 in the center of the tray circulates air or gas to dry the PVA.

In addition to the embodiment of FIG. 1, which illustrates a single pass through a heating oven, multipass ovens are known which would permit multiple passes of the PVA film 15 through the oven thereby increasing the speed of the film 15 through the oven in view of its longer residence time therein.

In addition, such ovens can save floor space in a manufacturing facility as they are conventionally arranged vertically, rather than horizontally. Thus, it is believed that belt drying is the best mode of the invention.

It should be understood that other, alternative apparatus, may be employed to form VAM-free particles and resulting dispersions/emulsions of such particles without departing from the scope of the appended claims.

Unless otherwise indicated, all percentages in this specification and appended claims are "by weight."

Having described my invention, it will be apparent that those skilled in the art will be able to alter or modify the invention without departing from the spirit thereof or from the appended claims.

We claim:

1. A process of forming a substantially vinyl acetate monomer free dispersion of polyvinyl acetate polymer in aqueous carrier, said process comprising (a) drying a vinyl acetate monomer-containing dispersion of polyvinyl acetate polymer to obtain a dried product of substantially vinyl acetate monomer-free polyvinyl acetate polymer;

(b) optionally comminuting the dried product of step (a); and (c) redispersing the dried product into an aqueous carrier in sufficient amounts so as to make a fluid adhesive.

2. The process of claim 1 further comprising applying the dispersion onto a release surface to form a film and exposing the film to elevated temperatures.

3. The process of claim 2 wherein the elevated temperature does not exceed 200° F.

4. The process of claim 1 wherein the comminuting comprises grinding the dried product.

5. The process of claim 1 wherein said drying comprises belt-drying.

6. The process of claim 1 wherein said drying is conducted under such conditions that all volatiles are removed.

7. The process of claim 1 wherein said polyvinyl acetate polymer in said aqueous carrier also comprises polyvinyl alcohol.

8. The process of claim 7 wherein the weight ratio of said polyvinyl alcohol to said polyvinyl acetate is approximately 1:13.

9. The process of claim 2 wherein the polyvinyl acetate polymer-containing dispersion is free of an anti-caking agent.

10. The process of claim 1 further comprising conducting said drying on a tray drier.

* * * * *